(12) United States Patent
Snell

(10) Patent No.: US 6,382,568 B1
(45) Date of Patent: May 7, 2002

(54) PORTABLE MEDICAL DIAGNOSTIC EQUIPMENT ORGANIZER

(76) Inventor: Richard Snell, 7751 NW. 45th St., Lauderhill, FL (US) 33351

( * ) Notice: Subject to any disclaimer, the term of this patent is extended or adjusted under 35 U.S.C. 154(b) by 0 days.

(21) Appl. No.: 09/625,458

(22) Filed: Jul. 26, 2000

(51) Int. Cl.7 ................................................. F16L 3/22
(52) U.S. Cl. ........................... 248/68.1; 128/DIG. 26; 604/80
(58) Field of Search .................. 248/68.1, 69, 74.4; 604/174, 179, 180, 80; 128/DIG. 26

(56) References Cited

U.S. PATENT DOCUMENTS

| | | | | |
|---|---|---|---|---|
| 4,308,642 A | * | 1/1982 | Heyman | 24/306 |
| 4,702,736 A | * | 10/1987 | Kalt | 604/180 |
| 4,838,878 A | * | 6/1989 | Kalt | 604/180 |
| 4,988,062 A | * | 1/1991 | London | 248/68.1 |
| 4,988,388 A | * | 1/1991 | Taylor | 604/180 |
| 5,037,397 A | * | 8/1991 | Kalt | 604/174 |
| 5,163,914 A | * | 11/1992 | Abel | 604/180 |

* cited by examiner

Primary Examiner—Kimberly T. Wood
Assistant Examiner—Gwendolyn Baxter
(74) Attorney, Agent, or Firm—Malin, Haley & DiMaggio, P.A.

(57) ABSTRACT

A tube and wire organizer for medical situations is an aide to organize adjunctive equipment used by paramedical and medical people including an oxygen supply tube for an oxygen mask, EKG electrode wires, a defibrillator and wires and intravenous therapy supply tubes (IV drug therapy) the wires and tubes of which can be organized and kept separate by a separating block that has a plurality of channels along the top and removably closed by a hook/loop fastening strap across the top.

1 Claim, 1 Drawing Sheet

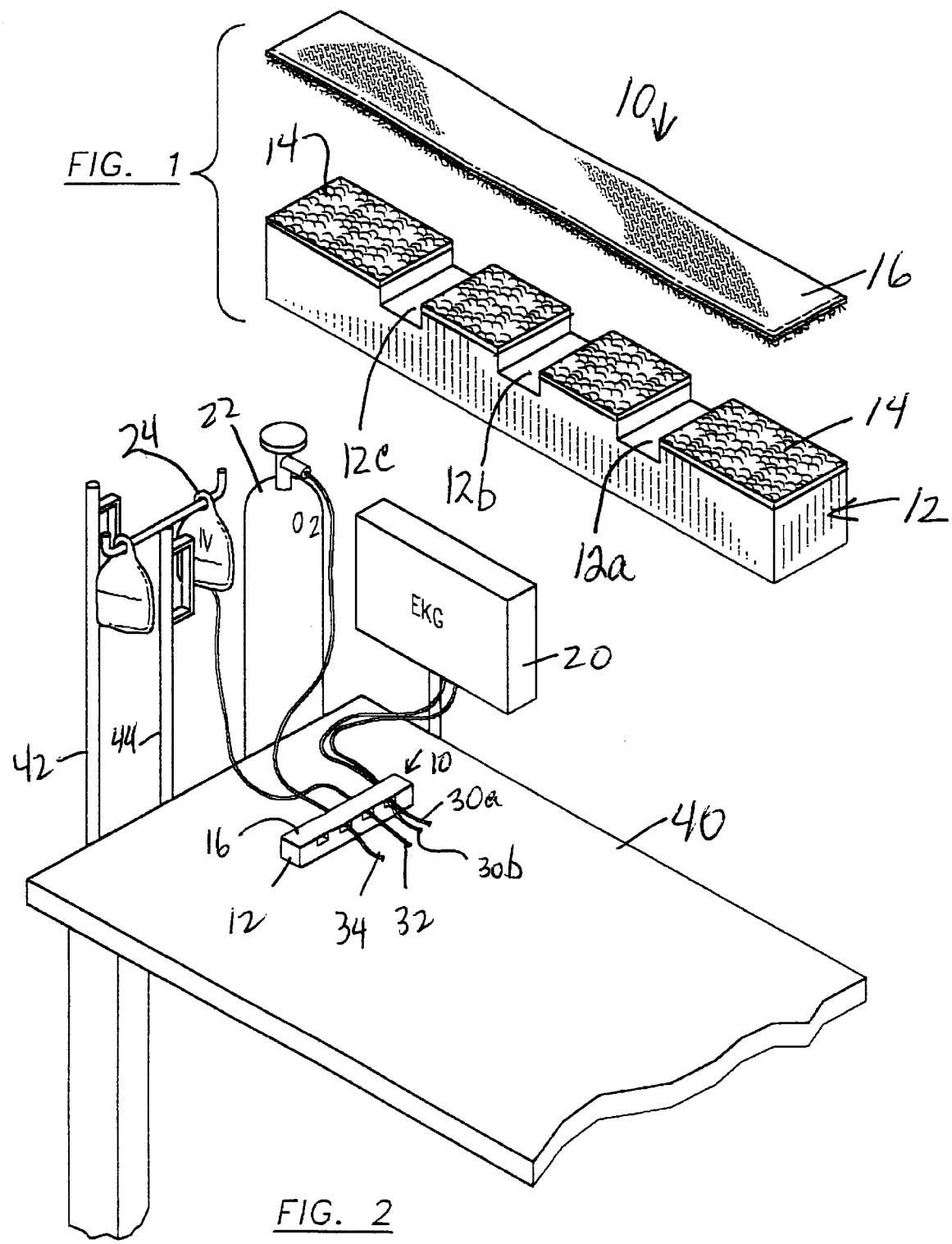

PORTABLE MEDICAL DIAGNOSTIC EQUIPMENT ORGANIZER

BACKGROUND OF THE INVENTION

1. Field of the Invention

A portable medical equipment organizer for use by paramedical personnel in a medical emergency to expedite deployment of necessary diagnostic medical equipment, and specifically to a medical equipment organizer that has a plurality of different diagnostic and medical wires and tubes that are mounted in a single package that can be expeditiously deployed during an emergency without entangling all the wires and tubes together.

2. Description of Related Art

Medical and paramedical personnel that are deployed in rescue vehicles and ambulances require the use of medical diagnostic and treatment equipment at the scene of an emergency in situations where seconds can mean life or death. The time required to retrieve medical equipment, deploy the equipment and treat the patient is critical. Typically, at a medical emergency scene, rescue and paramedical personnel utilize intravenous tubes in order to supply drugs or nutrients to an injured person, oxygen tubes to provide oxygen to the patient, and diagnostic equipment such as an EKG device which requires the deployment of electrodes on to the patient's body. As can be readily understood in an emergency situation, trying to deploy EKG electrodes while administering oxygen through a tube and deploying I.V. through a separate tube can be time consuming, requiring sorting of the various tubes and electrodes resulting in loss of time. The EKG equipment alone has a number of separate wires that are deployed to different parts of the patient's body with electrodes anchored at the end. The intravenous I.V. catheter requires a long, narrow plastic tube and a needle that must be placed in the skin of the patient. Finally the oxygen tube has a cannula or face mask that is typically mounted in the nose or mouth to provide oxygen the patient.

Time can be wasted sorting out various equipment elements and deploying the elements on the patient's body. Because these systems such as EKG, defibrillator oxygen and I.V. are separate systems, typically, each system is stored alone and deployed individually.

U.S. Pat. No. 4,241,833 issued Dec. 30, 1980, describes a paramedic kit which is basically like a storage box with individually articles used by a paramedic that can be retrieved. U.S. Pat. No. 4,479,762 issued Oct. 30, 1984, shows a prepackaged fluid processing system that may include plasma and other fluids to be administered in a suitcase like environment. U.S. Pat. No. 4,513,866 issued Apr. 30, 1985, shows a medical emergency pack that is much like a backpack that contains first aid supplies. U.S. Pat. No. 4,169,550 issued Oct. 2, 1979, shows an emergency medical kit that has a plurality of pockets and straps for storing medical equipment.

None of the references above show a portable medical organizer for diagnostic and treatment type system which the user can readily deploy intravenous tubes, oxygen and EKG and electrodes and defibrillator wires from a single-portable unit that maintains and separates each of the wires and tubes in an organized manner for fast and methodical deployment.

BRIEF SUMMARY OF THE INVENTION

A portable medical equipment organizer which includes intravenous tubes and applicator, oxygen supply tubes and oxygen administrator such as a nose cannula and EKG system that includes electrodes and wires, comprising a portable housing that includes a storage area for oxygen supply tubes, a second storage area for EKG wires and third storage area for intravenous tubes. The system includes a one or more rigid elongated support members each of which include a plurality of small channels along the top portion, each of which is sized to receive an oxygen tube in one channel, an intravenous tube in another channel and in yet another channel or channels EKG and/or defibrillator wires. The upper exposed channels can be removably covered and the tubes therein secured by a flexible cloth or plastic strip having a surface within a hook/loop fastener that attaches to the top surface of the separating block which allows each individual tube/wire within each individual channel to be secured, keeping each separated from each other. One or more separating blocks can be deployed at an emergency scene to separate tubes, defibrillator wires, and EKG wires at all times so that the tubes and wires do not get tangled. The separating block is light weight and can be placed on the patient's body.

The operator can then easily distinguish and keep separated the I.V. tube which can be attached to the patient, the oxygen tube and mask or cannula which can also be attached to the face of the patient and one or more of EKG electrodes that can be readily deployed and kept separate from each other through the use of one or more separation blocks.

The tube and wire separation block can be easily adjusted or moved relative to the tubes and wire to different positions relating to each of the tubes and wires by opening or closing the hook/loop fastener top strap or by sliding the separating block longitudinally along the tubes wires to provide additional spacing near the tube and wire ends or between other separation blocks if more than one block is employed.

Each separation block is made of a rigid material such as plastic that can be cleaned with bleach or made as a disposable. Each block can be 4–12 inches long and have series of 4 or more channels or grooves along the top surface. The block channels are parallel to each other at least one-half inch in depth and one inch wide and spaced one or more inches apart. The upper surface of the separation block includes a hook and loop fastener known under the trademark Velcro. Narrow hook/loop fastener strips that correspond to the size of the hook/fastener closure strap are glued on the block top surface which allows each channel to be securely closed so that the tubes and wires cannot be removed from the separating block channels unless the fastening strap is manually removed. The surface of the block can have written indicia in indelible ink to tell of a particular drug being used. The indicia can not be erased.

One or more tube/wire separating blocks can be deployed depending on the number of tubes and EKG electrode wires being used.

A storage housing can be used to store one or more separation blocks in a single box.

It is the object of this invention to provide an improved paramedical equipment organizer for tubes and EKG electrode wires and that keep the tubes and wires separated to allow for easy deployment in a medical emergency scene.

It is another object of this invention to provide an improved portable diagnostic and test treatment organizer that includes a plurality of separating blocks that keep $O_2$ tubes, I.V. tubes, defibrillator wires and EKG wires individually separated from each other while attached to emergency medical equipment in a paramedical situation.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 1 shows a perspective view of an embodiment of the invention with the fastener strap exploded above the tube/wire separation block.

FIG. 2 shows a perspective view of the inventions connected to emergency equipment.

DETAILED DESCRIPTION OF THE INVENTION.

Referring now to the drawings, and, in particular, FIG. 1, the invention is shown generally at 10 comprised of a rigid tube and wire separation block 12 which is substantially rectangular in shape. The length of the separating block could be 12 inches or more. The width and height could be as much as 2 inches each. The block includes two or more channels such as channel 12a, 12b and 12c which are sized in depth and width to receive EKG and defibrillator wires or an oxygen tube, or intravenous supply tube. The top surface of the separation block 12 includes a plurality of hooks/loop fastener straps glued to the top surface.

A flexible elongated hook/loop strap 16 which has a hook and loop fastener on one side is sized to cover the length of the separating block 12 and the channels. The strap 16 can be engaged to each of the hook/loop fastener pads 14 mounted on the top of the separating block 12 in order to secure a tube or wire in each of the channels 12a, 12b, and 12c when engaged in a fastened position. The strap 16 is a removeable closure for the channels and could also be rigid and affixed. Although three channels are shown in FIG. 1 in the separation block 12, more channels could be provided with additional hook/loop fastener pads on the top of the block 12.

FIG. 2 shows the present invention 10 in operation. Typically, an EKG 20 has a pair of wires 30a, and 30b. An oxygen supply tank 22 has a flexible plastic oxygen supply tube 34. Also, attached to suspended support 44 and 42 is an I.V. bag 24 that includes a supply of plastic tube 32. For the sake of illustration, FIG. 2 shows the invention 10 supported on a table top or patient platform 40. The invention includes the separation block 12 and the removable clause fastener strip 16. As shown in FIG. 2, the EKG wires 30a and 30b are disposed and secured within one of the channels in the separation block 12. The IV tube 32 is received in a separate channel.

The oxygen tank 22 and its supply tube 34 are also mounted in a separate channel in the separation block 12. Not shown in FIG. 2 is a patient. The separation block 12 could be resting on the chest or stomach of the patient with the individual wires 30b having an electrode at each end connected to the patient and the I.V. 32 supply tube could be connected to the patient along with the oxygen supply tube 34 in mounted into a cannula or mask on the face of the patient.

The important aspect of the invention is that each of the wires and tubes 38, 30b, 32, and 34 are separated from each other. The block 12 allows sufficient room for the tubes and wires to move relative to block 12 by manually moving a block in either direction. The wires and tubes are kept separated at all times. Additional separation blocks 12 could be used depending on the length of the wires and tubes and the location.

FIG. 2 shows one separating block 12. Additional separating blocks 12 can be used at various lengths of the supply tubes and wires from the EKG or defibrillator depending on the particular environment or situation.

The invention 10 can be deployed in an ambulance or emergency vehicle environment or outdoors in an environment of an emergency vehicle at the crash scene or in a hospital or clinic. In an outdoor or vehicle environment the EKG would be a portable unit, along with a small portable oxygen supply and with an on the scene portable intravenous or IV supply bag.

Indicia in indelible ink can be written near a channel on the block surface to identify a drug in use.

The use of the present invention by emergency paramedical equipment can be deployed rapidly without entangling the necessary tubes and wires required at an accident scene.

The medical line organizer is an aide to organize the adjunctive equipment used by the American Heart Association during a cardio life support effort.

The adjunctive equipment used is an oxygen mask or cannula, EKG, a defibrillator, intravenous therapy and or IV drug therapy.

The tube and wire organizer an assist the technician in quickly locating the proper line necessary for the specific use at the proper time with an emergency vehicle, at an emergency crash scene or in an emergency room in a hospital.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An emergency organizer for simultaneously separating tubes and wires for an EKG device having wires and electrodes, an oxygen tank having an oxygen supply tube and cannula or mask, an I.V. supply and I.V. supply tubes and a defibrillator comprising:

at least one rigid rectangular wire and tube separation block, said block being substantial elongated and having a plurality of parallel recessed channels disposed on the top surface of said block;

a plurality of individual hook/loop fastener straps disposed completely along the top surfaces of said separation block, said top surfaces separated from each other by said block recessed channels, said hook/fastener straps covering the entire block top surface area;

a flexible strap having a hook/loop fastener disposed along one side of said strap sized to cover the entire top surface area of said separation block and engageable to the entire area of the hook/loop fastener straps on said top surface of said separation block to form a plurality of closed channels with said block recess channels, said separating block recess channels being sized to receive an oxygen supply tube in one channel, an IV supply tube in a separate channel and one or more EKG wires in yet another channel, said strap being usable or engageable manually, whereby emergency equipment supply tubes and wires are kept separated in each of said individual recessed block channels.

* * * * *